United States Patent

Zadno-Azizi et al.

[11] Patent Number: 5,772,105
[45] Date of Patent: Jun. 30, 1998

[54] CLAD SHAPE MEMORY ALLOY COMPOSITE STRUCTURE AND METHOD

[75] Inventors: Gholam Reza Zadno-Azizi, Newark; Raj Subramaniam, Fremont; Mir A. Imran, Palo Alto, all of Calif.

[73] Assignee: Surface Genesis, Inc., Menlo Park, Calif.

[21] Appl. No.: 767,631

[22] Filed: Dec. 17, 1996

Related U.S. Application Data

[62] Division of Ser. No. 507,752, Jul. 26, 1995, Pat. No. 5,611,874.

[51] Int. Cl.⁶ .................................................. B23K 31/02
[52] U.S. Cl. .......................... 228/175; 228/151; 228/128
[58] Field of Search .................................. 228/144, 146, 228/147, 149–151, 235.1, 235.2, 265; 29/446

[56] References Cited

U.S. PATENT DOCUMENTS

| | | | |
|---|---|---|---|
| 1,984,083 | 12/1934 | Riemenschneider | 228/147 |
| 2,054,939 | 9/1936 | Larson | 228/151 |
| 2,300,850 | 11/1942 | Wolcott | 228/151 |
| 4,035,007 | 7/1977 | Harrison et al. | 428/960 |
| 4,518,444 | 5/1985 | Albrecht et al. | 148/402 |
| 5,213,111 | 5/1993 | Cook et al. | 128/772 |
| 5,242,002 | 9/1993 | Oku | 148/402 |
| 5,272,486 | 12/1993 | Dickinson | 343/719 |
| 5,276,455 | 1/1994 | Fitzsimmons et al. | 343/777 |
| 5,808,246 | 2/1989 | Albrecht et al. | 148/563 |

FOREIGN PATENT DOCUMENTS 3161181  7/1991  Japan ..................................... 228/151

*Primary Examiner*—Samuel M. Heinrich
*Attorney, Agent, or Firm*—Flehr Hohbach Test Albritton & Herbert LLP

[57] ABSTRACT

A composite structure comprising a body having a surface. Cladding covers at least a part of the surface. The body and the cladding are formed of different materials, at least one of which is a shape memory alloy having a recoverable strain in excess of 1.0%.

10 Claims, 2 Drawing Sheets

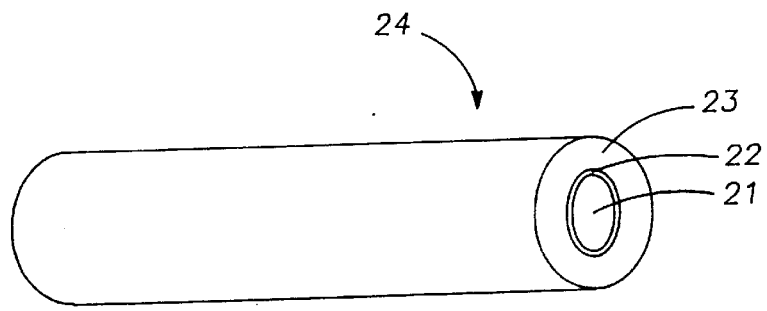
FIG.-1
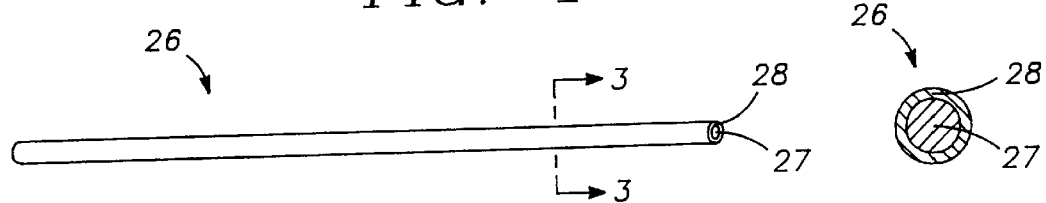
FIG.-2          FIG.-3
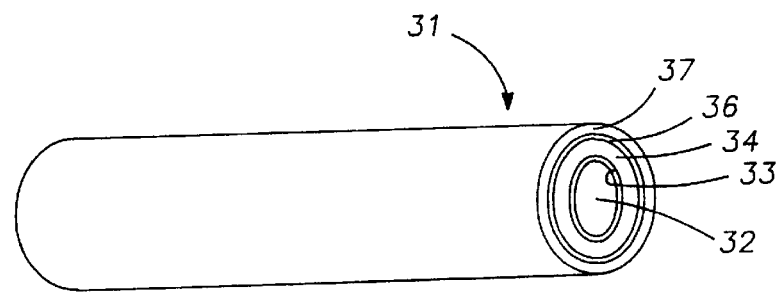
FIG.-4
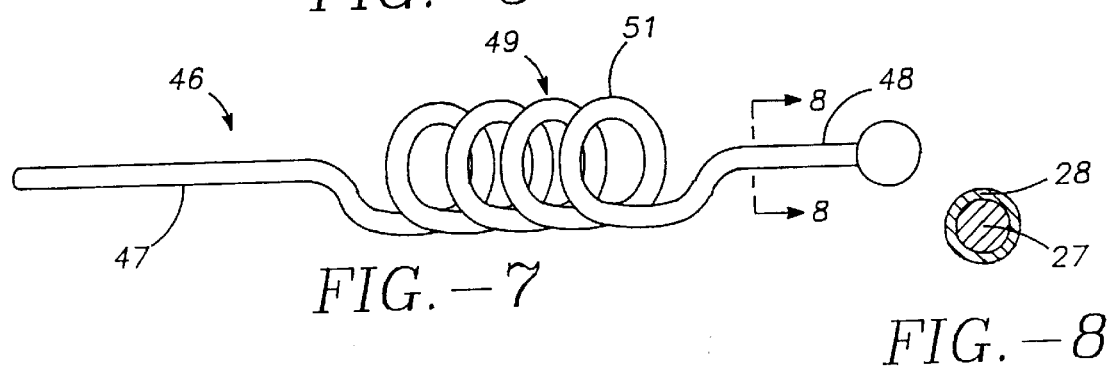
FIG.-5          FIG.-6
FIG.-7          FIG.-8

CLAD SHAPE MEMORY ALLOY COMPOSITE STRUCTURE AND METHOD

This is a division of application Ser. No. 08/507,752 filed Jul. 26, 1995, now U.S. Pat. No. 5,611,874.

This invention relates to a clad shape memory alloy composite structure and method for making the same.

Shape memory alloy wire and sheets heretofore have been made. However, forming the wire and sheets from shape memory alloy ingots has been difficult and expensive. For example, in making wire from a nickel titanium alloy and starting with a bar of the nickel titanium alloy, a number of different wire drawing passes are necessary. Annealing is required after each three or four passes and cold working is limited to approximately 40% between anneal steps. Since such shape memory alloy materials are generally very abrasive, there is extensive wear on the dies during the drawing process. The use of such shape memory alloys also has been limited because of the poor conductivity of such shape memory alloys. In addition, the welding and joining of such shape memory alloys has been difficult because of its inter-metallic structure. Attempts have been made to plate such shape memory alloys to improve their soldering capabilities and also to improve the conductivity. Such plating has been generally relatively unsuccessful because the adhesion of such plating materials to the shape memory alloy is less than optimum. For that reason, when the shape memory alloys are subject to deformation, the plating has a tendency to flake off. There is therefore a need for a composite structure and method to overcome these difficulties.

In general, it is an object of the present invention to provide composite structure and method incorporating the present invention which makes use of at least one clad shape memory alloy.

Another object of the invention is to provide a structure and method of the above character in which superelastic and actuator shape memory alloys are used.

Another object of the invention is to provide a structure and method of the above character which can be readily formed and shaped minimizing die wear.

Another object of the invention is to provide a structure and method of the above character which has improved conductivity.

Another object of the invention is to provide a structure and method of the above character which has improved weldability and solderability.

Another object of the invention is to provide a structure and method of the above character which can incorporate shape memory alloys having superelastic and/or actuator capabilities.

Another object of the invention is to provide a structure and method of the above character which can be utilized in the fabrication of many different types of devices.

Additional objects and features of the invention will appear from the following description which the preferred embodiments are set forth in conjunction with the accompanying drawings.

FIG. 1 is an isometric view of an assembly which can be drawn down to form a composite structure which incorporates the shape memory alloy and which is ready to be drawn down into a wire formed of a composite structure incorporating the present invention.

FIG. 2 is isometric view of a wire formed from drawing down of the composite assembly shown in FIG. 1.

FIG. 3 is an enlarged cross-sectional view taken along the line 3—3 of FIG. 2.

FIG. 4 is an isometric view of an assembly of two different shape memory alloys, one of which may be superelastic alloy and the other which may be an actuator alloy and a cladding material.

FIG. 5 is an isometric view of a wire formed from the composite assembly shown in FIG. 4 to provide a wire having a composite structure incorporating the present invention.

FIG. 6 is a cross-sectional view taken along the line 6—6 of FIG. 5.

FIG. 7 is an isometric view of an antenna fabricated from a composite structure of the present invention.

FIG. 8 is an enlarged cross-sectional view taken along the line 8—8 of FIG. 7.

Figure 10:
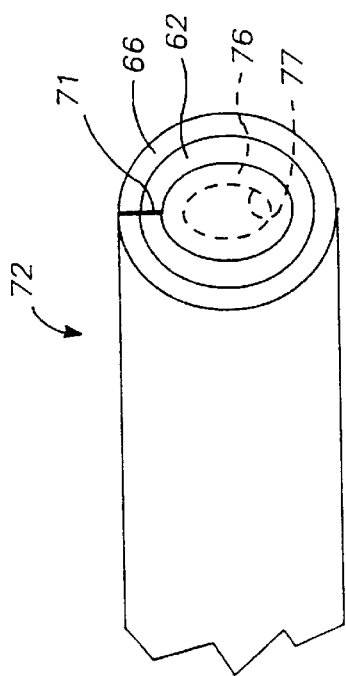
FIG. 10 is a cross-sectional view showing the sheet assembly material in FIG. 9 after it has been drawn down and thereafter slit to width and cut to length and rolled into a cylinder and welded longitudinally to form an elongate tubular member such as a hypotube.

In general, the composite structure of the present invention is comprised of a body having a surface and cladding covering at least a part of said surface and being in intimate contact with the surface. The body and the cladding are formed of different materials with at least one of the materials being a shape memory alloy. The shape memory alloy has a recoverable strain in excess of 1.0% and preferably in excess of 1.5%.

The characteristics of shape memory alloys utilizable in the present invention are described in a book entitled "*Engineering Aspects of Shape Memory Alloys*" by T. W. Duerig, K. N. Melton, D. Stockel and C. M. Wayman and published in 1990 by Butterworth-Heineman, Ltd. In connection with the present invention, shape memory alloys exhibiting superelastic capabilities and those alloys exhibiting actuator or work production capabilities are considered. The superelastic characteristics are isothermal in nature and involve the storage of potential energy. The actuator or work production applications involve motion against stress. Superelastic shape memory alloys can be deformed as much as ten times more than a conventional metal and still completely spring back to their original undeformed shapes. The superelasticity is caused by either twinning from the reversible motion of twin boundaries or by stress induced phase transformation with the latter being the most significant in connection with the present invention. Shape memory alloy actuators are generally based on the different stress-strain curves of the material in its austenitic and martensitic conditions. Nickel titanium and copper based shape memory alloys such as Cu-Zn-Al and Cu-Al-Ni are available. The nickel titanium alloys are often preferred because they have high strength, high electrical resistivity, larger recovery strains, easy workability and excellent corrosion resistance. For superelastic applications, the shape memory alloy may be a binary (near equi-atomic composition) of nickel-titanium, preferably with a nickel content of 49.5% to 51.5% (percent atomic) or a ternary 1 in which a small amount of a third element (preferably less than 10%) is added to nickel titanium such as Ni-Ti-Cu, Ni-Ti-Fe, Ni-Ti-V, Ni-Ti-Co, Ni-Ti-Cr. The copper-based superelastic shape memory alloy can be a Cu-Al-Ni nominally Cu-14.2 Al-4.3 Ni (Wt %), Cu-Zn-Sn of nominally Cu-34.7, Zn-3.0, Sn (Wt %) or Cu-Zn-AL nominally Cu-26.8 Zn-3.8 Al (Wt %). Actuator shape memory alloys are those materials that undergo solid phase transformation by changing the temperature in the material from the lower martensitic phase to the higher austenitic phase. These include Ni-Ti binary alloys with nickel content below 50.8% atomic or Ni-Ti-Cu, Ni-Ti-Fe, Ni-Ti-Mo, Ni-Ti-V with the third element composition from 0.5% to 20% copper-based shape memory alloys exhibiting actuation properties include Cu-Zn, Cu-Zn 1-Al$_n$; Cu-Zn-Al,Cu-Znl-Almn,Cu-Al-Ni-Mn. The iron based shape memory alloys can be Fe-Mn-Si.

Since the general properties of the shape memory alloys are well known from published literature, they will not be described in further detail.

Utilizing the information hereinbefore set forth, the ingot or bar or rod 21 is formed of a shape memory alloy having the desired characteristics and with a recoverable strain in excess of 1.0% and preferably in excess of 1.5%. Thus, the ingot can be formed of a shape memory alloy which has superelastic capabilities or alternatively actuator capabilities.

The shape memory alloy utilized in the ingot or rod 21 for the drawing operation has an ultimate tensile strength ranging from 120 ksi to 300 ksi and a resistivity ranging from approximately 80 to 150 micro-ohm-cm.

Such an ingot can have a suitable diameter as for example ranging from 0.25" to 2.0". The ingot or rod 21 as shown in FIG. 1 has been inserted into a cylindrical bore 22 provided in a cylinder 23 formed of a suitable cladding material as for example copper and having a wall thickness ranging from 0.05". The ingot or rod 21 and cylinder 23 form an assembly 24 which can be swaged in a conventional manner so that the cylindrical ingot or rod 21 is retained within the bore 22 of the cylinder to provide an assembly 24. The assembly 24 is utilized in conjunction with conventional wire drawing equipment and is drawn down through successive passes. Typically since a shape memory alloy is utilized in the ingot or rod 21, the number of passes between each anneal should be limited to 3–4 passes. The drawing operation is continued until the desired wire size has been achieved to provide a wire 26 having a suitable outside diameter as for example 0.213" with a center core 27 formed of the shape memory material and having a diameter of 0.021" and with cladding 28 extending over the core and having a suitable thickness, as for example 150 $\mu$ inches, thereby provide a conductive copper cladding for the wire 26. The drawing operation hereinbefore described creates strong adhesion between the core 27 and the cladding 28 and provides a very strong composite material or composite structure in the form of the wire 26. After the wire drawing operation, the shape memory alloy material forming the core which is the major portion of the cross-section can have the same ultimate tensile strength ranging from 120 ksi to 300 ksi. The total resistivity, however, will be very low, ranging from 20 micro-ohm-cm to 4.0 micro-ohm-cm. The cladding 28 can have a surface hardness which is no greater than that shape memory alloy of the core 27 and typically is substantially less than the hardness of the shape memory alloy core 27 and for example would have a Rockwell hardness similar to copper alloys ranging from 40 RB to 60 RB.

For the cladding 28, it should be appreciated that various types of materials can be utilized depending upon the characteristics desired for the end product. If stainless steel is used, it can have a hardness which is similar to that of the core 27. Typically in accordance with certain embodiments of the present invention, the cladding should have a hardness which is no greater than and preferably substantially less than the hardness of the shape memory alloy to substantially reduce the die wear during the wire forming process. To achieve a good conductivity for the cladding 28 which is a conductivity which is substantially above the conductivity of the shape memory alloy core 27, a highly conductive material such as copper, gold, silver, nickel and the like should be utilized. Where other or additional characteristics are designed for the cladding 28 other materials can be utilized as hereinafter described, as for example stainless steel, where good welding capabilities as well as strength are desired. Nickel can also be used as a cladding material where nickel characteristics are desired.

By way of example, if stainless steel is utilized for the cladding, as for example if an ingot 21 having a diameter of 0.5" can be inserted into a stainless steel tube of an inside diameter of 0.5" and an outside diameter of 0.650" it is possible to draw down the assembly 24 to very small cross sections with three or four drawing passes, each having a reduction in diameter ranging from 7% to 14% for a total of 30%–50% before an inter pass anneal at 700°–850° C. Depending on the final stiffness desired, the cross-sectional area of the core 27 and the cladding 28 can be adjusted by considering the respective moments of inertia of the respective areas as set forth below.

$$I \text{ (Moment of Inertia of Area of Core 27)} = \pi \frac{OD^4}{64} \text{ (a rod)}$$

$$I \text{ (Moment of Inertia of Area of Cladding 28)} = \pi \frac{OD^4 - ID^4}{64} \text{ (a cylinder)}$$

It is to be noted that in the case of composite shape memory alloys, the calculated moment of inertia of the actuator section should be slightly higher than that of the superelastic component. This is because during actuation the material should have extra strength to overcome the strength of the superelastic part in order to bend it.

When the cladding 28 is provided for improved conductivity for the composite wire 26 the resistivity (R) can be expressed as follows:

$$R = \frac{\frac{\rho_1}{S_1} \times \frac{\rho_2}{S_2}}{\frac{\rho_1}{S_1} + \frac{\rho_2}{S_2}} \times (S_1 + S_2)$$

where
$\rho_1$=resistivity of shape memory alloy
$\rho_2$=resistivity of cladding material
$S_1$=area of a shape memory alloy
$S_1$=area of cladding From the foregoing, it can be seen that the stiffness can be readily calculated with the contribution of the center core 27 and the contribution of the cladding 28 contributing more or less to the stiffness as desired. For example in utilizing nickel titanium alloy as the core 27 and stainless steel as a cladding 28 to provide greater stiffness, it is desirable that the nickel titanium core be of greater proportion of the area because of its modulus of elasticity is lower than that for stainless steel.

In addition to the characteristics desired for the cladding 28 hereinbefore described, cladding can also be provided to improve solderability and welding as well as providing an improved surface for plating. Also, the cladding can be selected in other applications to provide improved radiopacity and improved biocompatibility. For example, such capabilities can be provided with a gold cladding. In addition, the cladding material can be selected to provide improved pushability and torquability when, for example, a guide wire is made of a center core shape memory alloy and an outer layer of stainless steel.

Another assembly incorporating the present invention that can be utilized in a drawing operation is an assembly 31 that consists of a cylindrical rod 32 formed of a first or one shape memory alloy and which is disposed in a bore 32 provided in a cylinder 33 formed of a second or another shape memory alloy. The cylinder 33 is disposed within a bore 34 provided in another cylinder 36 formed of a material to provide the desired characteristics for a cladding. The assembly 31 can be swaged and then the entire assembly subjected to drawing operations of the type hereinbefore described. Two different shape memory alloy materials are utilized for the rod 32 and cylinder 34. In the present invention, one of the shape memory alloys exhibits superelastic characteristics and the other shape memory alloy exhibits actuator characteristics. The positions of the two shape memory alloys in the assembly 31 can be interchanged between the center core forming the rod 32 and the cylinder 34. Thus the rod 32 can be either a shape memory alloy exhibiting superelastic characteristics or a shape memory alloy exhibiting actuator characteristics with the cylinder 34 being formed of a material selected form the other of the two types of shape memory alloys. It should be appreciated that a plurality of layers can be formed by the cladding by the use of a plurality of inter-fitting cylinders. In this way, a plurality of different materials can be used in the cladding. Thus, if desired, three different shape memory alloys can be used. Two can be actuator shape memory alloys and one could be a superelastic shape memory alloy to achieve the desired characteristics for the end product.

The assembly 31 can be subjected to drawing operations of the type hereinbefore described with respect to the assembly 24 to provide a composite structure 41 in the form of a wire with a center core 42 formed of one shape memory alloy surrounded by a cylindrical sleeve formed of the other shape memory alloy which is surrounded by a cladding or sleeve 44.

By way of example, in the composite structure 41 as shown in FIG. 5, the core 42 can have a diameter of 0.005", the sleeve 43 an outside diameter of 0.006" and the cladding 44 having an outside diameter of 0.062" to provide a cladding having a wall thickness of 100 $\mu$ inches and with the sleeve 43 having a wall thickness of 0.0005".

It can be readily appreciated that the composite structures 26 and 41 can have many diverse uses and applications as for example guide wires in the medical applications such as angioplasty procedure. Guide wires having variable stiffness can also be provided. Other applications include the robotic devices, mechanical devices, valve actuators, flow controllers, thermal relays and the like.

One specific application of the composite structure 26 is shown in FIGS. 7 and 8 and consists of radio frequency antenna of the type which can be utilized in cellular phones. A suitable length of the composite structure 26 is cut off, as for example a length of 8" having a center core 27 formed of a nickel-titanium shape memory alloy having superelastic characteristics and with the core 27 having an outside diameter of 0.021". Copper cladding 28 having an outside diameter of 0.0213" and having a wall thickness of 150 $\mu$ inches is provided on the center core 27.

The antenna 46 is provided with first and second ends 47 and 48 and a helical coil 49 intermediate the ends 47 and 48 but in closer proximity to the end 48. The helical coil 49 is provided with a plurality of turns 51 as for example four as shown. The turns 51 can have a suitable diameter as for example 0.125" with a suitable spacing between the turns, for example 0.060". The helical coil 49 can be formed in the material of the composite structure in a manner well known to those skilled in the art by bending of the composite structure. The coil 49 can be shape set in a conventional manner as for example a temperature of 500° C. for a period of time ranging from 1–15 minutes.

The copper cladding provided on the superelastic core provides excellent radio frequency propagation and reception characteristics while the core formed of the superelastic material provides excellent anti-destructive characteristics for the radio frequency antenna. Because of the superelastic material, the antenna can withstand sharper bends without breaking or causing permanent deformation so that it will spring back to its original conformation. Such an antenna will not break or bend and will bounce back to its normal position when released.

In applications of the composite structure 41 shown in FIGS. 5 and 6, the core 42 can be formed of a shape memory alloy having actuator characteristics. These actuator characteristics can be activated by applying heat to the shape memory alloy as for example by applying heat from an external source or by generating the heat internally by passing electrical energy through the shape memory alloy to cause it to achieve the shape set in its memory. When the shape memory alloy cools, the composite structure can be returned to its original shape by the other shape memory alloy having superelastic characteristics forming the sleeve 43. Thus rather than providing a spring back from stainless steel which is approximately only 0.5%, a spring back greater than 7% can be achieved by utilizing the superelastic shape memory alloy. It can be seen that a composite structure can be provided having superior characteristics with respect to spring back. It should be appreciated that the functions of the core 42 and the sleeve 43 can be interchanged. For example, the sleeve 43 can be formed of a shape memory alloy having actuator characteristics and the core 42 can be formed of a shape memory alloy having the superelastic characteristics.

Figure 9:
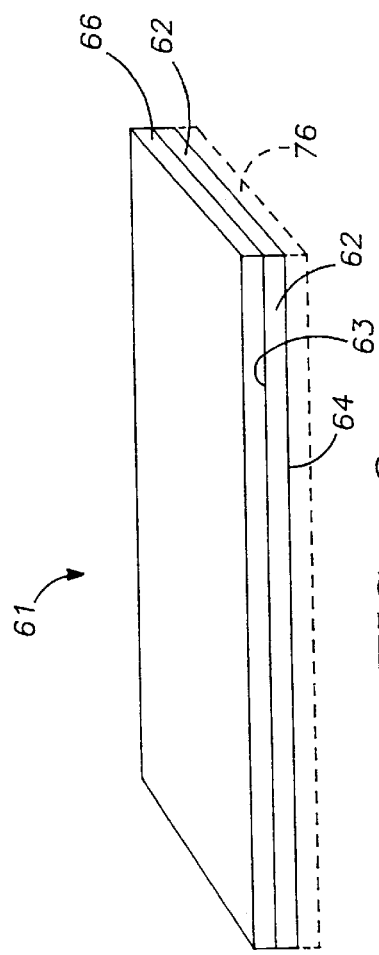
FIG. 9 is an isometric view of a sheet assembly forming a composite structure in which one of the sheets is formed of a shape memory alloy having a surface and which the surface is covered by a sheet of cladding material.

Although the present invention heretofore has been described as being utilized with cylindrical materials, similar results can be achieved by utilizing sheet materials. Thus as shown in FIG. 9, a sheet-like composite structure 61 has been provided. The composite structure 61 consists of a sheet 62 formed of a shape memory alloy having top and bottom surfaces 63 and 64. Cladding in the form of a sheet 66 covers at least a part of one of the surfaces 63 and 64 and as shown covers the entire surface 63.

In use in guide wires, shape memory alloy material can be clad with stainless steel to provide good torque transmission and good pushability, with the good torque transmission being provided by the shape memory alloy and by the stainless steel, the desired pushability being provided by the stainless steel to thereby provide a composite structure having capabilities which are superior to either one alone with respect to torquability and pushability.

As a starting assembly (not shown), the sheets 62 and 66 have a suitable width as for example 1" to 10" and a suitable thickness as for example 0.25" for the shape memory alloy and a thickness ranging from 0.125" to 0.25" for the cladding material of the sheet 66, as for example of stainless steel. The assembly can then be rolled down to the desired thickness by three to four passes between each anneal to provide a final composite structure 61 as shown in FIG. 9 in which the composite structure 61 would have a great length and could be slit into appropriate widths and cut into appropriate lengths. For example, a length of five feet could be provided with a width of 0.052" with the composite structure having a thickness of 0.0015" with the shape memory alloy layer having a thickness of 0.0010" and the cladding layer 66 having a thickness of 0.0005".

The composite sheet structure 61 can then be bent in a conventional manner into a circular form with abutting edges as shown in FIG. 10 with the shape memory alloy layer being enclosed and the cladding layer 66 being outermost. A welded seam 71 joins the abutting edges to form a hypotube 72 having a suitable outside diameter as for example 0.018" and an inside diameter of 0.015". Such a hypotube 72 has many desirable advantages. For example, the stainless steel cladding provides biocompatibility whereas the shape memory alloy having superelastic capabilities provides anti-kinking capabilities when used in guide wires. It should be appreciated in connection with the foregoing that if desired, the other surface 64 of the shape memory alloy sheet 62 can be covered with another sheet 76 which is shown in dotted lines in FIG. 9 and of the same composition and thickness as the sheet 66 so that when the assembly 61 is rolled into the cylindrical form shown in FIG. 10, the interior lumen 77 extending through the tubular member 72 is provided with a biocompatible surface forming the same. Other attributes for the tubular member 72 can be provided. For example, if it is desired that the hypotube carry a conductive layer, this conductive layer can be provided by means of the exterior layer 66 being formed of a conductive material such as copper. Another method of joining is to spiral form the sheet around a mandrel of the desired diameter and welding along the edges of the sheet.

Figure 12:
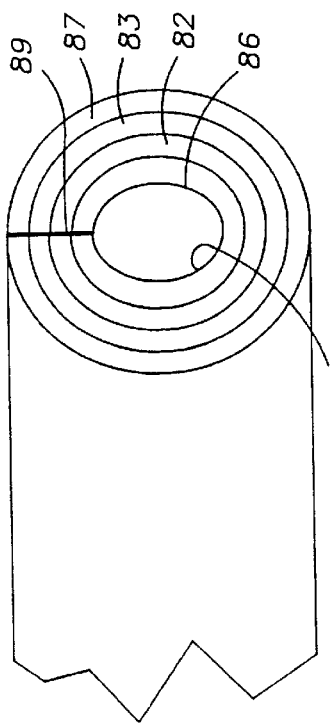
FIG. 12 is a cross-sectional view of an elongate tubular member formed from a composite sheet structure formed by drawing down the assembly shown in FIG. 11 and then rolled and welded longitudinally.
Figure 11:
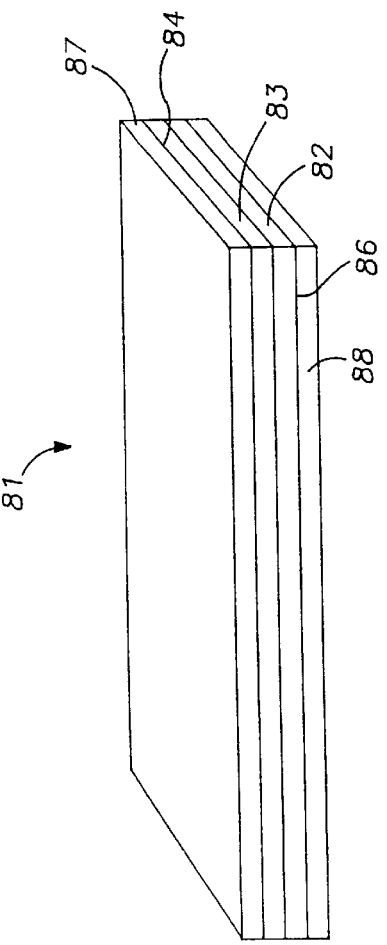
FIG. 11 is an isometric view of a sheet assembly formed of sheet materials which includes two different shape memory alloys and which are clad on both sides by sheets of cladding.

As with the cylindrical embodiments of the composite structure hereinbefore described, the sheet structure shown in FIGS. 9 and 10 also can be provided with layers of first and second shape memory alloys in which one of the shape memory alloys has superelastic characteristics and the other of the shape memory alloys has actuator characteristics. Thus as shown in FIG. 11, there can be provided a composite structure 81 which consists of two planar sheets 82 and 83 with the sheet 82 being formed of one shape memory alloy and the sheet 83 being formed of another shape memory alloy. The upper surface 84 of the sheet 83 and the bottom surface 86 of the sheet 82 can at least be partially covered by cladding by a sheet 87 covering the surface 84 and a sheet 88 covering the surface 86. Such an assembly of sheets can then be rolled in the manner hereinbefore described to provide the composite structure shown in FIG. 11 in which the sheets are intimately bonded to each other. The sheets then can be slit and cut to the desired length then rolled into a cylinder as shown in FIG. 12 and then welded to provide a longitudinally extending seam 89 to form an elongate tubular member 91 which has a lumen or passageway 92 extending therethrough.

Thus it can be seen that the composite structure 81 can be utilized in sheet form or in circular form. It also can be appreciated that other forms can be provided as for example an oval-shaped form if desired. Such composite structure can be utilized for making many devices, particularly where actuator capabilities are desired and it is desired that the composite structure return to its original shape after actuation has been completed.

From the foregoing, it can be seen that composite structures can be provided in accordance with the present method relatively inexpensively and with substantially reduced die wear and with the desired surface properties. The cost of fabricating the same can be greatly reduced. For example, hypotubes can be provided which have very small outside diameters and small wall thickness and still have the desired pushability and torquability. The desired thicknesses can be readily ascertained utilizing standard equations for strength of materials to choose between the shape memory alloys and the cladding. The cladding can be chosen to provide the desired properties for the final composite structure in addition to providing a material which facilitates formation of the shape memory alloys to greatly reduce the cost of forming such memory alloys. It should be appreciated that after the composite material has been formed, and it is desired not to have the cladding on any of the surfaces, the cladding can be removed by appropriate techniques such as chemical etching. For example, a copper cladding layer can be removed by a nitric acid etch.

Also in accordance with the present invention, it can be seen that the cladding can be comprised of a plurality of layers of different materials with the different materials including superelastic and actuator shape memory alloys. For example, two different compositions of actuator shape memory alloys can be used in conjunction with a superelastic shape memory alloy to provide various characteristics for devices made therefrom.

We claim:

1. A method for forming a composite structure from first and second different materials in which at least one of the first and second different materials is a shape memory alloy having a hardness and the other of the two different materials excludes a shape memory material and has a surface hardness less than that of the shape memory alloy comprising the steps of providing a first body of one of the materials having a surface and placing a second body of the other material into contact with the surface of the first body to form am assembly, drawing down the assembly to a reduced cross-sectional area to establish intimate strong adhesive mechanical contact between the surface of the first body and the second body to provide cladding in contact with the surface.

2. A method as in claim 1 wherein the cladding is provided on the entire surface of the first body.

3. A method as in claim 1 wherein the first body is in the form of a rod and wherein the second body is in the form of a cylinder having a bore therein and wherein the rod is disposed in the bore to form the assembly before drawing down of the assembly.

4. A method as in claim 1 wherein the first body is in the form of a sheet having first and second surfaces and wherein the second body is in the form of a sheet in contact with the first surface of the first body to provide the assembly before drawing down of the assembly to form a composite sheet structure.

5. A method as in claim 4 together with the step of placing a sheet of a third body of the other material in contact with the second surface of the body to form the assembly before drawing down of the assembly to provide a composite sheet structure.

6. A method as in claim 5 further including the step of slitting the composite sheet structure to a desired width and rolling the sheet-like structure of a desired width into a cylinder having abutting side edges and forming a weld between the abutting side edges to form an elongate tubular member.

7. A method as in claim 1 wherein the step of drawing down is accomplished in a plurality of passes.

8. A method as in claim 7 further including the step of annealing the assembly each time the assembly has been subjected to a predetermined number of passes.

9. A method as in claim 7 wherein the predetermined number of passes ranges from 3–4 passes.

10. A method as in claim 1 wherein the other material has a hardness which is substantially less than the hardness of the shape memory alloy to substantially reduce die wear during the drawing down process.

* * * * *